United States Patent
Heinken

(10) Patent No.: US 11,098,640 B2
(45) Date of Patent: Aug. 24, 2021

(54) METHOD FOR DETERMINING A BASIC BOOST PRESSURE OF A GAS CONDUCTING SYSTEM OF AN INTERNAL COMBUSTION ENGINE, AND ENGINE CONTROLLER FOR CARRYING OUT A METHOD OF THIS TYPE

(71) Applicant: Volkswagen Aktiengesellschaft, Wolfsburg (DE)

(72) Inventor: Sebastian Heinken, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/780,145

(22) Filed: Feb. 3, 2020

(65) Prior Publication Data

US 2020/0173346 A1   Jun. 4, 2020

Related U.S. Application Data

(63) Continuation of application No. PCT/EP2018/069983, filed on Jul. 24, 2018.

(30) Foreign Application Priority Data

Aug. 3, 2017   (DE) .................. 10 2017 213 497.6

(51) Int. Cl.
   *F02B 37/12*   (2006.01)
(52) U.S. Cl.
   CPC .................... *F02B 37/12* (2013.01)
(58) Field of Classification Search
   CPC ...... F02D 41/0007; Y02T 10/12; F02B 37/12; F02B 37/18; F02B 37/24
   See application file for complete search history.

(56) References Cited

U.S. PATENT DOCUMENTS

| 6,898,933 B2 | 5/2005 | Klingseis |
| 6,918,250 B2 | 7/2005 | Baeuerle |

(Continued)

FOREIGN PATENT DOCUMENTS

| DE | 101 45 038 A1 | 4/2003 |
| DE | 102 35 013 A1 | 2/2004 |

(Continued)

OTHER PUBLICATIONS

Heywood, "Internal combustion engine fundamentals," in Internal Combustion Engine Fundamentals, US, NY, McGraw Hill, ISBN 978-0-07-100499-2, pp. 250-255 (Jan. 1, 1988).

*Primary Examiner* — Jesse S Bogue
(74) *Attorney, Agent, or Firm* — Muncy, Geissler, Olds & Lowe, P.C.

(57) ABSTRACT

A method for determining a basic boost pressure of a gas conducting system of an internal combustion engine with a turbocharger that has a compressor, a turbine, a shaft connecting the compressor and the turbine, and a turbocharger actuator for varying a flow velocity through the turbine or a pressure ratio across the turbine. The method comprises calculation of an exhaust gas back pressure at the open turbocharger actuator position, wherein the flow velocity through the turbine or the pressure ratio across the turbine is minimal in the open turbocharger actuator position, and determination of the basic boost pressure as a function of the calculated exhaust gas back pressure at the open turbocharger actuator position. An engine controller for carrying out a method for determining a basic boost pressure is also provided.

18 Claims, 4 Drawing Sheets

(56) References Cited

U.S. PATENT DOCUMENTS

| | | | |
|---|---|---|---|
| 7,540,148 B2 | 6/2009 | Wild et al. | |
| 7,748,217 B2 * | 7/2010 | Muller | G06F 30/20 |
| | | | 60/602 |
| 8,353,198 B2 | 1/2013 | Burkhardt et al. | |
| 8,931,271 B2 * | 1/2015 | Fontvieille | F02D 23/00 |
| | | | 60/602 |
| 2008/0168771 A1 * | 7/2008 | Roettger | F02D 41/0007 |
| | | | 60/602 |
| 2009/0094009 A1 | 4/2009 | Muller | |
| 2011/0098876 A1 * | 4/2011 | Burkhardt | F02B 37/18 |
| | | | 701/31.4 |
| 2011/0126810 A1 * | 6/2011 | Andersson | F02D 41/0007 |
| | | | 123/564 |
| 2012/0023932 A1 * | 2/2012 | Ge | F02D 41/0007 |
| | | | 60/602 |
| 2012/0318235 A1 * | 12/2012 | Kaiser | F02D 11/105 |
| | | | 123/350 |
| 2013/0013166 A1 * | 1/2013 | Petrovic | F02B 37/013 |
| | | | 701/102 |
| 2015/0101578 A1 * | 4/2015 | Suchy | F02M 26/05 |
| | | | 123/568.11 |
| 2015/0144113 A1 | 5/2015 | Merkle et al. | |
| 2015/0345377 A1 * | 12/2015 | Ge | F02D 41/1447 |
| | | | 415/1 |
| 2017/0298811 A1 * | 10/2017 | Santillo | F02D 41/0007 |

FOREIGN PATENT DOCUMENTS

| | | |
|---|---|---|
| DE | 102 43 268 A1 | 3/2004 |
| DE | 10 2007 023 559 B3 | 12/2008 |
| DE | 10 2008 049 020 A1 | 4/2010 |
| DE | 10 2011 055 452 A1 | 5/2013 |
| DE | 10 2013 004 631 A1 | 5/2014 |
| DE | 10 2013 113 167 A1 | 5/2015 |
| FR | 2 921 114 A1 | 3/2009 |
| WO | WO 03/027464 A1 | 4/2003 |
| WO | WO 2008/142058 A2 | 11/2008 |
| WO | WO 2014/125185 A1 | 8/2014 |

\* cited by examiner

METHOD FOR DETERMINING A BASIC BOOST PRESSURE OF A GAS CONDUCTING SYSTEM OF AN INTERNAL COMBUSTION ENGINE, AND ENGINE CONTROLLER FOR CARRYING OUT A METHOD OF THIS TYPE

This nonprovisional application is a continuation of International Application No. PCT/EP2018/069983, which was filed on Jul. 24, 2018, and which claims priority to German Patent Application No. 10 2017 213 497.6, which was filed in Germany on Aug. 3, 2017, and which are both herein incorporated by reference.

BACKGROUND OF THE INVENTION

Field of the Invention

The present invention relates to a method for determining a basic boost pressure of a gas conducting system of an internal combustion engine, and to an engine controller for carrying out such a method. In particular, the invention relates to a method for determining a basic boost pressure of a gas conducting system of an internal combustion engine of a motor vehicle, for example a gasoline engine or a diesel engine of a motor vehicle, and to an engine controller for carrying out such a method.

Description of the Background Art

In modern engines of motor vehicles, the engine charge plays an important role, since it can be used to influence the efficiency of the engine significantly. Typically, therefore, the engines have actuators for adjusting the charge (charge control elements). A throttle valve and a turbocharger, preferably a turbocharger with a wastegate or a variable turbine geometry charger (VTG charger), are examples of charge control elements for engines.

The throttle valve and the turbocharger can be adjusted simultaneously, which is to say in parallel operation. This means that the two actuators are actively working against one another under some circumstances. Thus, it can occur that the boost-pressure level is raised by the turbocharger and the throttle valve throttles, which is to say works in opposition to it, which results in increased consumption by the unit. It is necessary to prevent such operation.

However, if these two control devices can be unambiguously delimited from one another (deactivation and activation), the turbocharger does not operate until the request for more charge can no longer be satisfied through further opening of the throttle valve. This transfer of the control devices can take place at the limit of the basic boost pressure. The throttle valve operates below this pressure threshold, and above it the boost pressure controller operates by turbocharger.

It is necessary, therefore, to determine the current basic boost pressure. This can be accomplished, for example, by a modeling of the basic boost pressure such as is mentioned in DE 102 43 268 A1, which corresponds to U.S. Pat. No. 6,918,250. Patent DE 102 35 013 A1, which corresponds to U.S. Pat. No. 6,898,933, describes a method for determining a boost pressure setpoint by means of a speed-dependent basic value.

The known basic boost pressure models have only moderate accuracy, however. Because the area of basic boost pressure involves a certain fuzziness, data input takes place into the software to ensure good operating behavior, usually with the compromise that the two control devices operate in parallel and this entails a bit of additional consumption. Especially in motors that are based on the Miller combustion cycle, this compromise leads to problems, since the basic boost pressure significantly influences the motor concept.

SUMMARY OF THE INVENTION

It is therefore an object of the present invention to provide a method and an engine controller that at least partially overcome the abovementioned disadvantages.

According to an exemplary embodiment, the invention relates to a method for determining a basic boost pressure of a gas conducting system of an internal combustion engine with a turbocharger that has a compressor, a turbine, a shaft connecting the compressor and the turbine, and a turbocharger actuator for varying a flow velocity through the turbine or a pressure ratio across the turbine, comprising: calculation of an exhaust gas back pressure at the open turbocharger actuator position, wherein the flow velocity through the turbine or the pressure ratio across the turbine is minimal in the open turbocharger actuator position; and determination of the basic boost pressure as a function of the calculated exhaust gas back pressure at the open turbocharger actuator position.

The invention also relates to an engine controller for an internal combustion engine with a gas conducting system with a turbocharger that has a compressor, a turbine, a shaft connecting the compressor and the turbine, and a turbocharger actuator for varying a flow velocity through the turbine of the internal combustion engine or a pressure ratio across the turbine, which engine controller is designed to carry out a method for determining a basic boost pressure of the gas conducting system of the internal combustion engine, in particular a method according to the first aspect, which comprises: calculation of an exhaust gas back pressure at the open turbocharger actuator position, wherein the flow velocity through the turbine or the pressure ratio across the turbine is minimal in the open turbocharger actuator position; and determination of the basic boost pressure as a function of the calculated exhaust gas back pressure at the open turbocharger actuator position.

The invention relates also to an internal combustion engine with an engine controller.

A motor vehicle is also provided with an internal combustion engine according to the above.

The present invention relates to a method for determining a basic boost pressure of a gas conducting system of an internal combustion engine with a turbocharger that has a compressor, a turbine, a shaft connecting the compressor and the turbine, and a turbocharger actuator for varying a flow velocity through the turbine or a pressure ratio across the turbine. The gas conducting system can additionally include a throttle valve, an intake line, an exhaust pipe, and additional gas-carrying components. The intake line can be connected to the internal combustion engine, for example a gasoline engine, a combustion engine that works according to the Miller cycle, or a diesel engine, in order to supply the engine with fresh air. The compressor of the turbocharger and, downstream of it in the direction of flow, the throttle valve, can be accommodated in the intake line, wherein a pressure after the compressor or before the throttle valve is referred to as boost pressure. The exhaust pipe can be connected to the internal combustion engine to carry exhaust gas away from it.

The basic boost pressure is the boost pressure that prevails when the throttle valve is maximally open and the turbocharger actuator is in the open turbocharger actuator position, in which a flow velocity through the turbine or a pressure ratio across the turbine is minimal. Accordingly, the basic boost pressure can differ from a current boost pressure if the turbine is in a turbocharger actuator position that is different from the open turbocharger actuator position. Furthermore, the basic boost pressure can be a function of a turbine geometry of the turbine of the turbocharger. In other words, the basic boost pressure is defined by the pressure that is established upstream of the throttle valve when the turbocharger is not driven. Thus, it approximately describes a wide open throttle of a naturally aspirated engine with the side note that the turbocharger generates a certain compressor output even without being driven. This thus raises the basic boost pressure above an ambient pressure to a greater or lesser extent as a function of the turbocharger geometry.

According to the method of the invention, an exhaust gas back pressure at the open turbocharger actuator position is calculated, in particular modeled, wherein the flow velocity through the turbine or the pressure ratio across the turbine is minimal in the open turbocharger actuator position. In the open actuator position, a boost pressure component that is caused by the turbocharger can be minimized. For example, in the open actuator position, a flow cross-section through and/or around the turbine can be maximal, by which means the flow velocity can be minimized and if applicable the boost pressure component of the turbocharger can be minimized. The exhaust gas back pressure can be the pressure upstream of the turbine.

According to the method of the invention, the basic boost pressure is then determined as a function of the calculated exhaust gas back pressure at the open turbocharger actuator position. The basic boost pressure can additionally be dependent upon currently prevailing conditions of the gas conducting system. The determination of the basic boost pressure is discussed in detail further below.

The basic boost pressure can be determined very reliably by means of the exhaust gas back pressure at the open turbocharger actuator position that was determined for the open position of the turbocharger.

The turbocharger can be a variable turbine geometry charger (VTG charger) with adjustable guide vanes as actuators, and the guide vanes can be in the steepest setting in the open turbocharger actuator position. Alternatively or in addition, the turbocharger can have a wastegate with a valve as an actuator, which is fully open in the open turbocharger actuator position.

The exhaust gas back pressure can be determined by means of an exhaust gas back pressure model at the open turbocharger actuator position or by means of a wastegate model at the open turbocharger actuator position. In particular, in the case that the turbocharger is a variable turbine geometry charger with adjustable guide vanes as actuators, the exhaust gas back pressure can be determined by means of an exhaust gas back pressure model that is based on a turbine with guide vanes in the steepest possible setting. In the case that the turbocharger is a wastegate with a valve as an actuator, the exhaust gas back pressure can be determined by means of a wastegate model that is based on a turbocharger with fully open wastegate.

A turbine speed at the open turbocharger actuator position can additionally be determined as a function of the modeled exhaust gas back pressure at the open turbocharger actuator position. The basic boost pressure can then be determined as a function of the turbine speed determined at the open turbocharger actuator position.

The turbine speed can be determined by the means that a pressure ratio across the turbine at the open turbocharger actuator position is determined as a function of the modeled exhaust gas back pressure at the open turbocharger actuator position, an exhaust gas mass flow (also called turbine mass flow) is determined at the open turbocharger actuator position, and the turbine speed is determined as a function of the pressure ratio and the exhaust gas mass flow that have been determined. The pressure ratio is modeled, for example. The exhaust gas mass flow can also be modeled. Instead of the exhaust gas mass flow, a normalized exhaust gas mass flow can be determined and used to determine the turbine speed. To determine the normalized exhaust gas mass flow, an exhaust gas temperature at the open turbocharger actuator position can be determined, in particular can be modeled, and the normalized exhaust gas mass flow $\dot{m}_{A,norm}$ can be calculated from the exhaust gas mass flow $\dot{m}_A$ and the exhaust gas temperature $T_A$ on the basis of the proportionality $$\dot{m}_{A,norm} \approx \dot{m}_A \sqrt{T_A}.$$

The turbine speed can be determined by means of a speed model, in particular a turbine characteristic map. The turbine characteristic map can be a turbine characteristic map that can be spanned across the pressure ratio at the open turbocharger actuator position and the exhaust gas mass flow. The output is then the turbine speed at the open turbocharger actuator position. In addition, the inputs can be normalized to the exhaust gas temperature. The basic boost pressure can be determined reliably by means of the modeled exhaust gas back pressure at the open turbocharger actuator position, which is part of the pressure ratio.

The turbine speed can therefore be dependent upon an exhaust gas back pressure at the open turbocharger actuator position, the pressure downstream of the turbine, the exhaust gas mass flow, the exhaust gas temperature, and the open turbocharger actuator position.

The compressor speed at the open turbocharger actuator position can correspond to a turbine speed at the open turbocharger actuator position. This is a result of the circumstance that the compressor and the turbine are tightly coupled to one another by the shaft, and consequently always rotate at the same speed. Thus, for example, by means of a speed model on the turbine side, for instance through calculation of an exhaust gas back pressure model at the open turbocharger actuator position, the following statement can be made for the compressor side:

$$n_T = n_V,$$

where $n_T$ is the speed of the turbine (turbine speed) and $n_V$ is the speed of the compressor (compressor speed). A specific feature at this point is that the turbine speed, and consequently the compressor speed, correspond to the state of an open turbocharger, and not necessarily the current value of the turbine or compressor speed.

It is possible in the method to determine a compressor speed at the open turbocharger actuator position as a function of the modeled exhaust gas back pressure at the open turbocharger actuator position, in particular in a different manner than described above, for example through a suitable characteristic map. The basic boost pressure can then be determined as a function of the compressor speed at the open turbocharger actuator position that has been determined. Again, the use of the modeled exhaust gas back pressure makes possible a reliable determination of the basic boost pressure.

A fresh air mass flow at the open turbocharger actuator position can be obtained according to the method, and a pressure ratio across the compressor at the open turbocharger actuator position can be determined as a function of the compressor speed at the open turbocharger actuator position and of the fresh air mass flow. The basic boost pressure can then be determined as a function of the pressure ratio. In place of the fresh air mass flow, a normalized fresh air mass flow can be determined and used to determine the basic boost pressure. To determine the normalized fresh air mass flow, a fresh air temperature at the open turbocharger actuator position can be determined, and the normalized fresh air mass flow $\dot{m}_{FL,norm}$ can be calculated from the fresh air mass flow $\dot{m}_{FL}$ and the fresh air temperature $T_{FL}$ on the basis of the proportionality $$\dot{m}_{FL,norm} \approx \dot{m}_{FL}\sqrt{T_{FL}}.$$

The fresh air mass flow can be measured. For example, the fresh air mass flow can be measured with an air mass sensor, preferably a hot film air mass sensor (HFM). Alternatively, the fresh air mass flow can be modeled, for example by means of a pressure-based charge sensing.

The pressure ratio can be determined by means of a compressor characteristic map. By means of the calculated compressor speed and the fresh air mass flow, the pressure ratio across the compressor can be determined with the aid of the compressor characteristic map.

A compressor upstream pressure can be determined upstream of the compressor. The basic boost pressure can then be determined as a function of the pressure ratio at the open turbocharger actuator position and of the compressor upstream pressure that has been determined. In particular, the pressure ratio across the compressor that has been determined is multiplied by the compressor upstream pressure to obtain the basic boost pressure, which is to say the pressure downstream of the compressor when the turbocharger actuator is not driven.

The compressor upstream pressure can be determined on the basis of the ambient pressure. For example, the pressure upstream of the compressor can be represented through a model that is based on the ambient pressure. From this, a pressure loss can be modeled and subtracted that corresponds to a passive flow resistance of an air filter in the intake line.

The basic boost pressure can thus be dependent upon the compressor speed at the open turbocharger actuator position, the pressure upstream of the compressor, the fresh air mass flow, and the fresh air temperature.

Due to a reliable determination of the basic boost pressure, a boost pressure allowance can be reduced because the turbocharger is not activated until the throttle valve cannot provide more torque. Consequently, less throttling takes place, by which means additional consumption can be reduced.

In summary, the invention can be based on the following steps:

First, the exhaust gas back pressure at the open turbocharger actuator position is determined.

Next, the turbine speed can be determined. This speed can be ascertained by means of the turbine characteristic map through its input quantities, namely pressure ratio (open) across the turbine at the open turbocharger actuator position and exhaust gas mass flow. The pressure ratio used for the speed determination is thus the pressure ratio in the case that the setting of a variable turbine geometry or the degree of opening of a wastegate (bypass around the turbine), which enter into the calculation of the pressure ratio, are set in a fixed manner to a fully open value. Accordingly, it is preferably not the currently prevailing turbine speed that is ascertained, but instead the turbine speed (open) for the fully open state of the VTG (variable turbine geometry) or of the wastegate. The exhaust gas mass flow and the pressure ratio across the turbine can be modeled.

Then the turbine speed (open) can be transferred to the compressor speed (open).

After that, the pressure ratio across the compressor can be determined. This ratio can be determined via a compressor characteristic map, which the fresh air mass flow (modeled or measured) and the compressor speed (open) at the open turbocharger actuator position enter into.

Finally, the basic boost pressure is determined. This value can result from the pressure upstream of the compressor (corrected ambient pressure) and the pressure ratio (open) across the compressor.

The present invention models a delimitation between the use of the turbocharger and the use of the throttle valve very reliably, and represents thermodynamic boundary conditions very well. This stabilizes charge regulation at crossover and reduces consumption.

The present invention also relates to an engine controller for an internal combustion engine with a gas conducting system with a turbocharger that has a compressor, a turbine, a shaft connecting the compressor and the turbine, and a turbocharger actuator for varying a flow velocity through the turbine or a pressure ratio across the turbine. The gas conducting system can be designed as described above. The engine controller is designed to carry out a method for determining a basic boost pressure of the gas conducting system of the internal combustion engine, in which an exhaust gas back pressure at the open turbocharger actuator position is calculated, wherein the flow velocity through the turbine or the pressure ratio across the turbine is minimal in the open turbocharger actuator position, and the basic boost pressure is determined as a function of the calculated exhaust gas back pressure at the open turbocharger actuator position. The engine controller is designed, in particular, to determine a turbine speed as a function of the exhaust gas back pressure, to transfer the turbine speed to a compressor speed, and to determine the basic boost pressure as a function of the compressor speed. Preferably, the engine controller can be designed to carry out the above-described method for determining the basic boost pressure.

The engine controller can have a processor, in particular a microprocessor, for implementing the above-described method for determining the basic boost pressure. The control device, for example, engine controller can additionally have a memory, for example a data memory, in which can be stored characteristic maps, models, and other parameters and information necessary for implementing the above-described method for determining the basic boost pressure. In addition, the engine controller can have a data input for receiving measured data or other parameters, and a data output for outputting the basic boost pressure that has been determined or for controlling a throttle valve and the turbocharger.

The present invention also relates to an internal combustion engine with a gas conducting system with a turbocharger that has a compressor, a turbine, a shaft connecting the compressor and the turbine, and a turbocharger actuator for varying a flow velocity through the turbine or a pressure ratio across the turbine, wherein the internal combustion engine has the above-mentioned engine controller. The internal combustion engine can be or contain a gasoline engine, a combustion engine that works according to the Miller cycle, or a diesel engine.

The present invention also relates to a motor vehicle with the above-described internal combustion engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
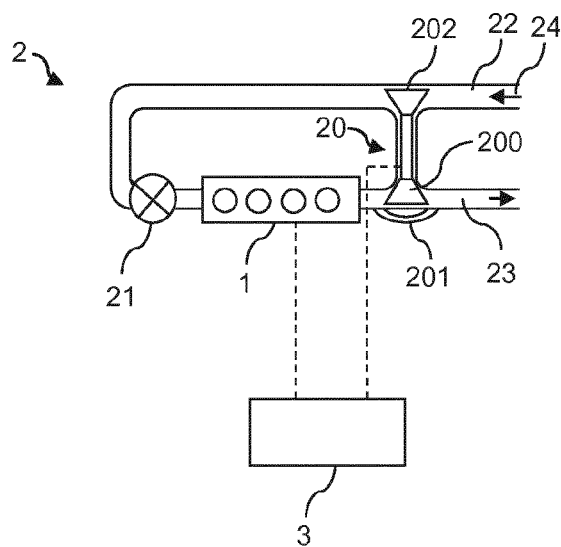
FIG. 1 is a schematic configuration of an internal combustion engine and a gas conducting system of the same with a turbocharger with wastegate.

FIG. 1 shows an internal combustion engine 1 and a first exemplary embodiment of a gas conducting system 2 of the internal combustion engine 1. The gas conducting system 2 has an exhaust turbocharger 20, a throttle valve 21, an intake passage 22, and an exhaust passage 23. The internal combustion engine 1 is connected to the intake passage 22 and to the exhaust passage 23. The exhaust turbocharger 20, which is provided for regulating a boost pressure in the intake passage 22, has a turbine 200, a wastegate 201, and a compressor 202, which is connected through a shaft to the turbine 200. The turbine 200 is arranged in the exhaust passage 23, and is driven by exhaust gas flowing out of the internal combustion engine 1. The wastegate 201 connects a section of the exhaust passage 23 upstream of the turbine 200 to a section of the exhaust passage 23 downstream of the turbine 200 in order to route exhaust gas around the turbine 200. To regulate the exhaust gas that is routed around the turbine 200, the wastegate 201 has a wastegate valve (not shown). The compressor 202 is arranged in the intake passage 22 and, driven by the turbine 200, compresses the fresh air in the intake passage 22. The throttle valve 21 is arranged in the intake passage 22 downstream of the compressor 202 of the exhaust turbocharger 20 in the direction of flow (arrow 24) and is designed to control the boost pressure in the intake passage 22.

FIG. 1 also shows an engine controller 3. The engine controller 3 is connected in each case to the internal combustion engine 1, the wastegate valve in the wastegate 201, and the throttle valve 21. The engine controller 3 is designed to control the internal combustion engine 1, the wastegate valve, and the throttle valve 21. To this end, the engine controller 3 determines a basic boost pressure of the gas conducting system 2 in accordance with the method 4 for determining the basic boost pressure, which is described with reference to FIG. 2 to FIG. 6, and uses this pressure to control the internal combustion engine 1 and the gas conducting system 2, which is to say the wastegate valve and the throttle valve.

Figure 2:
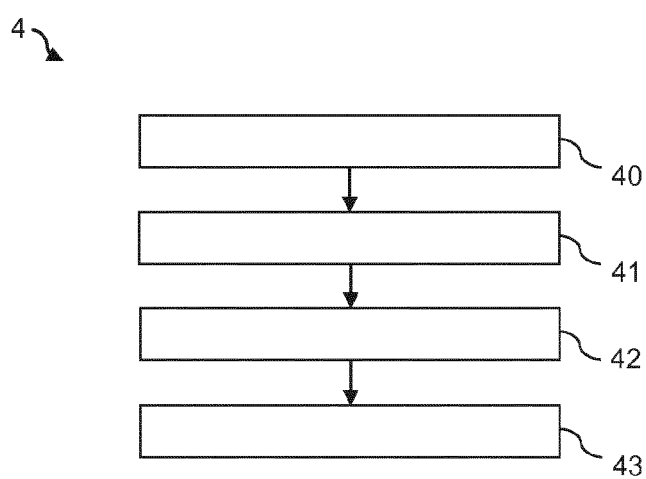
FIG. 2 is a schematic flowchart of a method for determining the basic boost pressure of the gas conducting system of the internal combustion engine from FIG. 1.

FIG. 2 shows a flowchart of a method 4 for determining the basic boost pressure in the gas conducting system 2 shown FIG. 1.

At 40, an exhaust gas back pressure upstream of the turbine is modeled in a state in which the wastegate valve is fully open and the flow velocity through the turbine and the wastegate is minimal.

At 41, the turbine speed is determined as a function of the exhaust gas back pressure with fully open wastegate valve. For example, the turbine speed can be determined by means of the method described by way of example with reference to FIG. 3 and FIG. 4.

Figure 3:
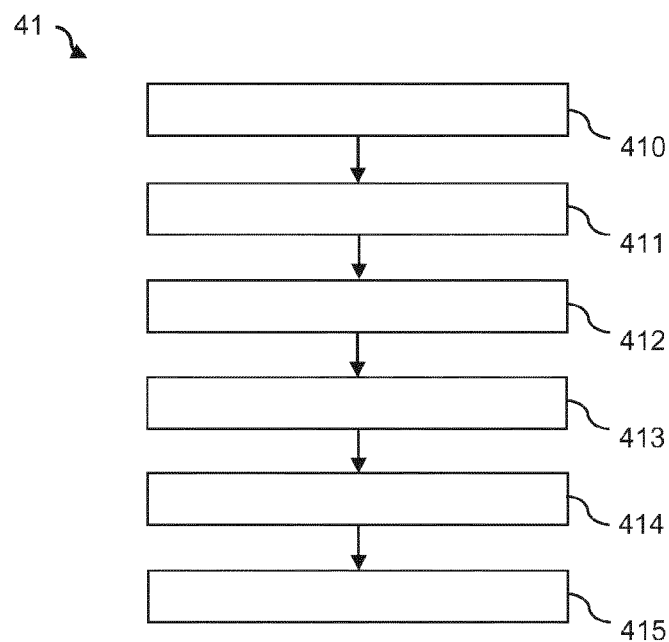
FIG. 3 is a schematic flowchart of a method for determining a turbine speed.
Figure 4:
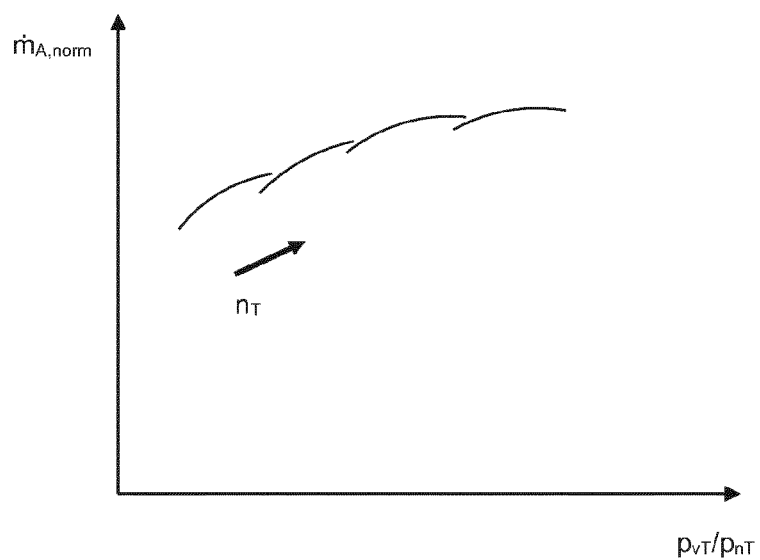
FIG. 4 is a schematic representation of a turbine characteristic map for open wastegate valve.
Figure 5:
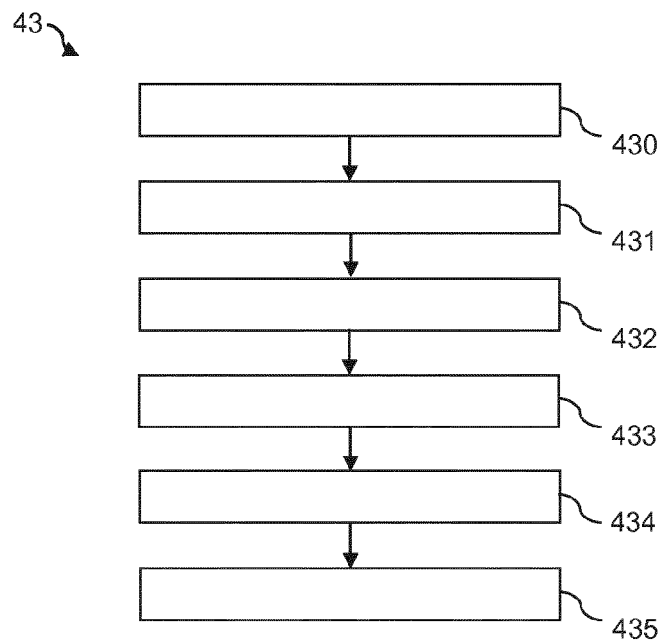
FIG. 5 is a schematic flowchart of a method for determining a pressure ratio.

At 410 in FIG. 3, a pressure in the exhaust passage downstream of the turbine is modeled by means of a model. The pressure ratio across the turbine is calculated at 411 from the exhaust gas back pressure with fully open wastegate valve and the modeled pressure downstream of the turbine. For this purpose, the exhaust gas back pressure with fully open wastegate valve is divided by the modeled pressure downstream of the turbine.

At 412, the exhaust gas mass flow through the exhaust passage or the turbine and the wastegate is modeled by means of a model. At 413, the exhaust gas temperature of the exhaust gas in the exhaust passage is determined. The normalized exhaust gas mass flow is then determined at 414 from the exhaust gas mass flow and the exhaust gas temperature.

At 415, the turbine speed is determined from the pressure ratio with fully open wastegate valve by means of a turbine characteristic map. The turbine characteristic map is spanned across the pressure ratio with fully open wastegate valve and the normalized exhaust gas mass flow, and makes possible a readout of the turbine speed. A schematic representation of a turbine characteristic map is shown by way of example in FIG. 4. The pressure ratio $p_{vT}/p_{nT}$ is plotted on a horizontal axis (x-axis), and the normalized exhaust gas mass flow $\dot{m}_{A,norm}$ is plotted on a vertical axis (y-axis). The turbine characteristic map shows the change in the normalized exhaust gas mass flow $\dot{m}_{A,norm}$ as a function of the pressure ratio $p_{vT}/p_{nT}$ for different turbine speeds $n_T$. For each turbine speed $n_T$, the exhaust gas mass flow $\dot{m}_{A,norm}$ increases with decreasing slope for increasing pressure ratio $p_{vT}/p_{nT}$. The greater the turbine speed $n_T$, the higher the exhaust gas mass flow $\dot{m}_{A,norm}$. The turbine speed $n_T$ can be determined from this turbine characteristic map.

At 42 in FIG. 2, the turbine speed $n_T$ with fully open wastegate valve is transferred to the compressor speed $n_V$ with fully open wastegate valve. Because the shaft of the turbocharger tightly connects the turbine and the compressor, the turbine speed $n_T$ always matches the compressor speed $n_V$, and the two speeds can be equated.

At 43, the basic boost pressure is determined as a function of the compressor speed. For example, the basic boost pressure can be determined by means of the method described by way of example with reference to FIG. 5 and FIG. 6.

At 430, the fresh air mass flow through the intake passage or the compressor is measured. Alternatively, the fresh air mass flow can also be modeled. At 431, the fresh air temperature of the fresh air flowing through the intake passage or the compressor is measured. The normalized fresh air mass flow is determined from the fresh air mass flow and the fresh air temperature at 432.

Figure 6:
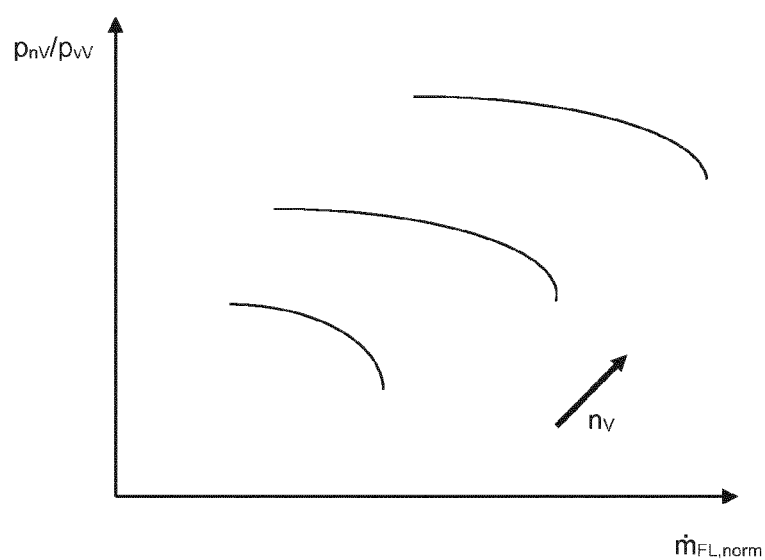
FIG. 6 is a schematic representation of a compressor characteristic map for open wastegate valve.

At 433, the pressure ratio across the compressor with fully open wastegate valve is determined by means of a compressor characteristic map as a function of the compressor speed with fully open wastegate valve and the normalized fresh air mass flow. The compressor characteristic map is spanned across the normalized fresh air mass flow and the pressure ratio across the compressor, and makes possible the readout of the pressure ratio for different compressor speeds. In FIG. 6, a schematic representation of a compressor characteristic map is shown by way of example. The normalized fresh air mass flow $\dot{m}_{FL,norm}$ is plotted on a horizontal axis (x-axis), and the pressure ratio $p_{nV}/p_{vV}$ across the compressor is plotted on a vertical axis (y-axis). The characteristic map shows the change in the pressure ratio as a function of the pressure ratio $p_{nV}/p_{vV}$ for different compressor speeds $n_V$. For each compressor speed, the pressure ratio $p_{nV}/p_{vV}$ decreases with increasing slope for increasing normalized fresh air mass flow $\dot{m}_{FL,norm}$. The greater the compressor speed $n_V$, the higher the fresh air mass flow $\dot{m}_{FL,norm}$. The pressure ratio $p_{nV}/p_{vV}$ for the compressor speed $n_V$ with fully open wastegate valve can be determined from this compressor characteristic map.

At 434, the pressure in the intake passage upstream of the compressor is determined by means of a model. The pressure upstream of the compressor is represented through a model that is based on the ambient pressure, wherein a pressure loss is modeled from and subtracted from this pressure, which pressure loss corresponds to a passive flow resistance of an air filter in the intake line.

At 435, the basic boost pressure is calculated from the pressure ratio across the compressor and the pressure upstream of the compressor. For this purpose, the pressure ratio across the compressor is multiplied by the pressure upstream of the compressor.

The basic boost pressure that is determined can be used to control the throttle valve, the turbocharger, and the internal combustion engine.

Figure 7:
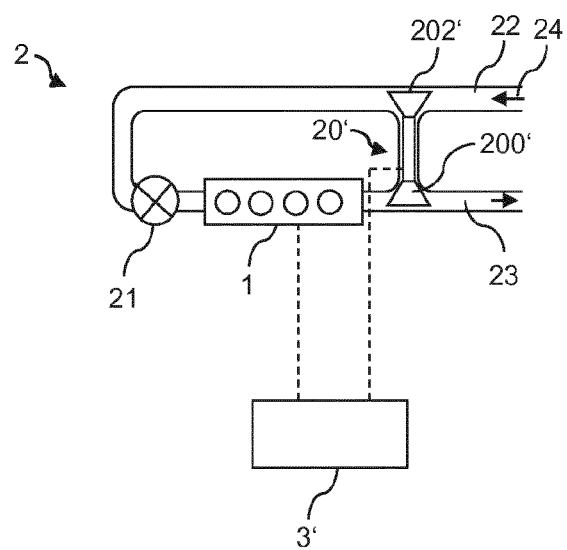
FIG. 7 is a schematic configuration of an internal combustion engine and a gas conducting system of the same with a turbocharger with variable turbine geometry.

FIG. 7 shows an internal combustion engine 1 and a second exemplary embodiment of a gas conducting system 2' of the internal combustion engine 1. In place of the turbocharger 20 with wastegate 201 shown in FIG. 1, the gas conducting system 2' has a VTG turbocharger 20' (variable turbine geometry charger). The VTG turbocharger 20' is equipped with a variable turbine geometry so that turbine vanes (not shown) of the turbine 200' can be adjusted between a shallowest possible setting and a steepest possible setting. In the shallowest possible setting, an exhaust gas back pressure upstream of the turbine 200' is maximal, while the exhaust gas back pressure upstream of the turbine 200' is minimal in the steepest possible setting.

The engine controller 3' is designed to carry out a method for determining the basic boost pressure. In this process, the method described with reference to FIG. 2 through FIG. 6 is carried out analogously, wherein the exhaust gas back pressure at the steepest possible setting of the guide vanes is assumed in place of the exhaust gas back pressure with fully open wastegate valve. The engine controller 3' then controls the guide vanes of the turbine, the throttle valve, and the internal combustion engine on the basis of the basic boost pressure that has been determined.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining a basic boost pressure of a gas conducting system of an internal combustion engine comprising a turbocharger that has a compressor, a turbine, a shaft connecting the compressor and the turbine, and a turbocharger actuator for varying a flow velocity through the turbine or a pressure ratio across the turbine, the method comprising:
   calculating, via a model, a modeled exhaust gas back pressure downstream of the turbine at an open turbocharger actuator position;
   calculating an exhaust gas back pressure at the open turbocharger actuator position of the turbocharger actuator based on when the flow velocity through the turbine or the pressure ratio across the turbine is minimal in the open turbocharger actuator position; and
   determining a basic boost pressure as a function of the calculated exhaust gas back pressure at the open turbocharger actuator position and the modeled exhaust gas back pressure downstream of the turbine at the open turbocharger actuator position.

2. The method according to claim 1, wherein the pressure ratio across the turbine is calculated based on the calculated exhaust gas back pressure at the open turbocharger actuator position divided by the modeled exhaust gas back pressure downstream of the turbine at the open turbocharger actuator position.

3. The method according to claim 1, wherein calculating, via the model, the modeled exhaust gas back pressure downstream of the turbine at an open turbocharger actuator position is based on an open throttle condition where a throttle valve of the internal combustion engine is maximally open, and
   wherein calculating an exhaust gas back pressure at the open turbocharger actuator position of the turbocharger actuator is based on an open throttle condition where a throttle valve of the internal combustion engine is maximally open.

4. The method according to claim 1, wherein the turbocharger is a variable turbine geometry charger with adjustable guide vanes as actuators, and the guide vanes being in a steepest setting in the open turbocharger actuator position; and/or wherein the turbocharger has a wastegate with a valve as actuator, which is fully open at the open turbocharger actuator position.

5. The method according to claim 1, wherein the exhaust gas back pressure is determined by an exhaust gas back pressure model at the open turbocharger actuator position or by a wastegate model at the open turbocharger actuator position.

6. The method according to claim 1, further comprising:
   determining a turbine speed at the open turbocharger actuator position as a function of the modeled exhaust gas back pressure at the open turbocharger actuator position,
   wherein the basic boost pressure is determined as a function of the turbine speed determined at the open turbocharger actuator position.

7. The method according to claim 6, further comprising:
   determining a pressure ratio across the turbine as a function of the modeled exhaust gas back pressure at the open turbocharger actuator position; and
   determining an exhaust gas mass flow; and determining the turbine speed as a function of the pressure ratio and the exhaust gas mass flow.

8. The method according to claim 6, wherein the turbine speed is determined via a speed model or a turbine characteristic map.

9. The method according to claim 6, wherein the compressor speed at the open turbocharger actuator position corresponds to a turbine speed at the open turbocharger actuator position.

10. The method according to claim 1, further comprising:
determining a compressor speed at the open turbocharger actuator position as a function of the modeled exhaust gas back pressure at the open turbocharger actuator position,
wherein the basic boost pressure is determined as a function of the compressor speed at the open turbocharger actuator position that has been determined.

11. The method according to claim 6, further comprising:
obtaining a fresh air mass flow or determining a normalized fresh air mass flow at an intake; and
determining a pressure ratio across the compressor at the open turbocharger actuator position as a function of the compressor speed at the open turbocharger actuator position and of the fresh air mass flow or the normalized fresh air mass flow,
wherein the basic boost pressure is determined as a function of the pressure ratio.

12. The method according to claim 11, wherein the fresh air mass flow is measured or modeled.

13. The method according to claim 10, wherein the pressure ratio is determined via a compressor characteristic map.

14. The method according to claim 11, further comprising:
determining a compressor upstream pressure upstream of the compressor,
wherein the basic boost pressure is determined as a function of the pressure ratio at the open turbocharger actuator position and the compressor upstream pressure that has been determined.

15. An engine controller for an internal combustion engine comprising a gas conducting system with a turbocharger that has a compressor, a turbine, a shaft connecting the compressor and the turbine, and a turbocharger actuator for varying a flow velocity through the turbine or a pressure ratio across the turbine,
wherein the engine controller is configured to carry out a method for determining a basic boost pressure of the gas conducting system of the internal combustion engine, the method comprising:
calculating, via a model, a modeled exhaust gas back pressure downstream of the turbine at an open turbocharger actuator position;
calculating an exhaust gas back pressure at the open turbocharger actuator position of the turbocharger actuator, based on the flow velocity through the turbine or the pressure ratio across the turbine being minimal in the open turbocharger actuator position; and
determining the basic boost pressure as a function of the calculated exhaust gas back pressure at the open turbocharger actuator position and the modeled exhaust gas back pressure downstream of the turbine at the open turbocharger actuator position.

16. The internal combustion engine with the gas conducting system comprising the turbocharger that has the compressor, the turbine, the shaft connecting the compressor and the turbine, the turbocharger actuator for varying the flow velocity through the turbine or the pressure ratio across the turbine, and the engine controller according to claim 15.

17. A motor vehicle comprising the internal combustion engine according to claim 16.

18. The engine controller according to claim 15, wherein the pressure ratio across the turbine is calculated based on the calculated exhaust gas back pressure at the open turbocharger actuator position divided by the modeled exhaust gas back pressure downstream of the turbine at the open turbocharger actuator position.

* * * * *